United States Patent
Zito et al.

(10) Patent No.: US 11,351,673 B2
(45) Date of Patent: Jun. 7, 2022

(54) ROBOTIC SLED-ENHANCED FOOD PREPARATION SYSTEM AND RELATED METHODS

(71) Applicant: Miso Robotics, Inc., Pasadena, CA (US)

(72) Inventors: David Zito, Pasadena, CA (US); Ryan W. Sinnet, Pasadena, CA (US); Robert Anderson, Pasadena, CA (US); Grant Stafford, Pasadena, CA (US); Sean Olson, Pacific Palisades, CA (US)

(73) Assignee: Miso Robotics, Inc., Pasadena, CA (US)

( * ) Notice: Subject to any disclaimer, the term of this patent is extended or adjusted under 35 U.S.C. 154(b) by 11 days.

(21) Appl. No.: 16/281,088

(22) Filed: Feb. 20, 2019

(65) Prior Publication Data

US 2019/0176338 A1    Jun. 13, 2019

Related U.S. Application Data

(63) Continuation-in-part of application No. 16/100,889, filed on Aug. 10, 2018, now Pat. No. 10,919,144, and
(Continued)

(51) Int. Cl.
*B25J 9/00* (2006.01)
*G06Q 10/00* (2012.01)
(Continued)

(52) U.S. Cl.
CPC ......... *B25J 11/0045* (2013.01); *B25J 9/0009* (2013.01); *G06Q 10/04* (2013.01);
(Continued)

(58) Field of Classification Search
CPC .... B25J 9/0009; B25J 11/0045; B25J 19/023; G06Q 10/04; G06Q 10/087; G06Q 50/12; G06Q 50/20
See application file for complete search history.

(56) References Cited

U.S. PATENT DOCUMENTS

| 4,545,723 A | 10/1985 | Clark |
|---|---|---|
| 4,853,771 A | 8/1989 | Witriol et al. |

(Continued)

FOREIGN PATENT DOCUMENTS

| JP | 2009106734 A | 5/2009 |
|---|---|---|
| JP | 5814305 B2 | 11/2015 |

(Continued)

OTHER PUBLICATIONS

"High Tech TUG Robots Will Do Heavy Lifting at Mission Bay." <http://www.ucsfmissionbayhospitals.org/articles/high-tech-tug-robots-do-heavy-lifting-at-mission-bay.html>). Accessed Mar. 17, 2021. Published 2015. (Year: 2015).*
(Continued)

*Primary Examiner* — Ericson M Lachica
(74) *Attorney, Agent, or Firm* — Richard Batt

(57) ABSTRACT

A robotic sled-enhanced food preparation system includes a robotic kitchen assistant operable to determine and to perform food preparation steps, and an autonomous mobile sled operable to supply the robotic kitchen assistant with ingredients and supplies. The robotic kitchen assistant includes a scheduling engine to evaluate food inventory levels and automatically determine when to replenish the food inventories using the sled if the food inventory levels are insufficient to complete the food preparation steps. Related methods are also described.

22 Claims, 10 Drawing Sheets

Related U.S. Application Data a continuation-in-part of application No. PCT/US2018/020948, filed on Mar. 5, 2018, application No. 16/281,088, which is a continuation-in-part of application No. PCT/US2018/021066, filed on Mar. 6, 2018.

(60) Provisional application No. 62/592,130, filed on Nov. 29, 2017, provisional application No. 62/467,743, filed on Mar. 6, 2017, provisional application No. 62/467,735, filed on Mar. 6, 2017, provisional application No. 62/633,589, filed on Feb. 21, 2018.

(51) Int. Cl.
  *G06Q 50/00* (2012.01)
  *B25J 11/00* (2006.01)
  *G06Q 10/04* (2012.01)
  *G06Q 50/12* (2012.01)
  *G06Q 10/08* (2012.01)
  *B25J 19/02* (2006.01)

(52) U.S. Cl.
  CPC ........... *G06Q 10/087* (2013.01); *G06Q 50/12* (2013.01); *B25J 19/023* (2013.01)

(56) References Cited

U.S. PATENT DOCUMENTS

| | | | |
|---|---|---|---|
| 4,919,950 A | 4/1990 | Mak | |
| 4,922,435 A * | 5/1990 | Cahlander | A47J 27/14 700/207 |
| 5,132,914 A | 7/1992 | Cahlander et al. | |
| 5,285,604 A | 2/1994 | Carlin | |
| 5,386,762 A | 2/1995 | Gokey | |
| 5,389,764 A | 2/1995 | Nishii et al. | |
| 5,458,384 A | 10/1995 | Liu et al. | |
| 5,466,025 A | 11/1995 | Mee | |
| 5,833,295 A | 11/1998 | Farlow, Jr. | |
| 5,893,051 A | 4/1999 | Tomohiro | |
| 7,174,830 B1 * | 2/2007 | Dong | B25J 9/0084 901/1 |
| 7,920,962 B2 | 4/2011 | D et al. | |
| 7,971,450 B2 | 7/2011 | Furlanetto et al. | |
| 8,276,505 B2 | 10/2012 | Buehler et al. | |
| 8,610,037 B2 | 12/2013 | Polt | |
| 8,820,313 B1 | 9/2014 | Lutes | |
| 9,285,589 B2 | 3/2016 | Osterhout et al. | |
| 9,483,875 B2 | 11/2016 | Theimer et al. | |
| 9,542,621 B2 | 1/2017 | He et al. | |
| 9,785,911 B2 | 10/2017 | Galluzzo et al. | |
| 9,815,191 B2 | 11/2017 | Oleynik et al. | |
| 10,005,184 B2 | 6/2018 | Gerio et al. | |
| 10,112,771 B2 | 10/2018 | D'andrea et al. | |
| 10,154,756 B2 | 12/2018 | Hall et al. | |
| 10,293,488 B2 | 5/2019 | Hall et al. | |
| 10,682,765 B2 | 6/2020 | Mirkhaef et al. | |
| 2002/0028127 A1 * | 3/2002 | Hart | B65B 35/52 414/788.1 |
| 2002/0082924 A1 | 6/2002 | Koether | |
| 2004/0111321 A1 | 6/2004 | Kargman | |
| 2004/0154474 A1 | 8/2004 | Chan | |
| 2005/0049940 A1 | 3/2005 | Tengler et al. | |
| 2005/0193901 A1 * | 9/2005 | Buehler | A47J 44/00 99/468 |
| 2008/0110347 A1 * | 5/2008 | Wong | A47J 36/165 99/348 |
| 2009/0192921 A1 * | 7/2009 | Hicks | G06F 3/0317 705/28 |
| 2011/0153614 A1 * | 6/2011 | Solomon | G06Q 10/087 707/740 |
| 2013/0033057 A1 | 2/2013 | Markham | |
| 2013/0275236 A1 * | 10/2013 | Koke | G06Q 10/06 705/15 |
| 2013/0302483 A1 | 11/2013 | Riefenstein et al. | |
| 2014/0031978 A1 * | 1/2014 | Takata | A21C 9/088 700/245 |
| 2014/0157698 A1 | 6/2014 | Cihak et al. | |
| 2014/0184496 A1 | 7/2014 | Gribetz et al. | |
| 2014/0203012 A1 | 7/2014 | Corona et al. | |
| 2014/0324607 A1 * | 10/2014 | Frehn | G06Q 50/12 705/15 |
| 2014/0334691 A1 | 11/2014 | Cho et al. | |
| 2014/0363266 A1 * | 12/2014 | Cooper | B65B 25/065 414/790.2 |
| 2015/0290795 A1 | 10/2015 | Oleynik et al. | |
| 2016/0078694 A1 * | 3/2016 | Swift | G07C 5/085 701/34.2 |
| 2016/0180546 A1 | 6/2016 | Kim et al. | |
| 2016/0239705 A1 | 8/2016 | Masood et al. | |
| 2016/0307459 A1 | 10/2016 | Chestnut et al. | |
| 2016/0327279 A1 | 11/2016 | Bhogal et al. | |
| 2016/0327281 A1 | 11/2016 | Bhogal et al. | |
| 2016/0334799 A1 * | 11/2016 | D'Andrea | B66F 9/063 |
| 2017/0011319 A1 | 1/2017 | Elliot et al. | |
| 2017/0116661 A1 * | 4/2017 | Sundaram | G06Q 30/0633 |
| 2017/0130968 A1 | 5/2017 | Nagraj et al. | |
| 2017/0169315 A1 | 6/2017 | Vaca et al. | |
| 2017/0178070 A1 * | 6/2017 | Wang | G06Q 10/04 |
| 2017/0206431 A1 | 7/2017 | Sun et al. | |
| 2017/0252922 A1 | 9/2017 | Levine et al. | |
| 2017/0305015 A1 | 10/2017 | Krasny et al. | |
| 2017/0348854 A1 | 12/2017 | Oleynik | |
| 2017/0364073 A1 * | 12/2017 | Guy | B25J 5/005 |
| 2018/0345485 A1 | 12/2018 | Sinnet et al. | |
| 2018/0365630 A1 * | 12/2018 | Seals | G06Q 10/087 |
| 2020/0046168 A1 | 2/2020 | Sinnet et al. | |
| 2020/0047349 A1 | 2/2020 | Sinnet et al. | |
| 2020/0121125 A1 | 4/2020 | Zito et al. | |

FOREIGN PATENT DOCUMENTS

| | | |
|---|---|---|
| WO | 0170087 A2 | 9/2001 |
| WO | 2006006624 A1 | 1/2006 |
| WO | 2012020858 A1 | 2/2012 |
| WO | 2015100958 A1 | 7/2015 |
| WO | 2015143800 A1 | 10/2015 |
| WO | 2016040361 A1 | 3/2016 |
| WO | 2015125017 A3 | 6/2016 |
| WO | 2017114014 A1 | 7/2017 |
| WO | 2017103682 A3 | 8/2017 |
| WO | 2018031489 A1 | 2/2018 |

OTHER PUBLICATIONS

B. Siciliano & O. Khatib, Handbook of Robotics, published by Springer-Verlag Berlin (2008).

Kaiming He, Georgia Gkioxari, Piotr Dollar, and Ross B. Girshick, Mask R-CNN, arXiv, 2017.

Beucher, Serge, and Fernand Meyer. "The morphological approach to segmentation: the watershed transformation." Optical Engineering—New York—Marcel Dekker Incorporated—34 (1992): 433-433.

Bonanni et al., "Counterintelligence: Augmented Reality Kitchen", CHI 2005, (Apr. 2, 2005), URL: http://citeseerx.ist.psu.edu/viewdoc/summary?doi=10.1.1.88.2875, (Jun. 12, 2018), XP055559956.

International Preliminary Examination Report dated Jul. 11, 2018 for PCT/US2018/020948.

International Preliminary Examination Report dated Jul. 20, 2018 for PCT/US2018/021066.

Ju Yong Chang, Haesol Park, In Kyu Park, Kyoung Mu Lee, Sang Uk Lee, GPU-friendly multi-view stereo reconstruction using surfel representation and graph cuts, Computer Vision and Image Understanding, vol. 115, Issue 5, 2011, pp. 620-634.

Krystal B., T he magic of Eatsa, explained, (Mar. 2, 2017), URL: https://www.washingtonpost.com/...017/03/02/57c95fb0-f55a-11e6-b9c9-e83fce42fb61 story.h tml?horedirect=on&utm_term=.108e357 d67 df, (May 21, 2018).

Lucas, Bruce D., and Takeo Kanade. "An iterative image registration technique with an application to stereo vision." (1981): 674-679.

(56) References Cited

OTHER PUBLICATIONS

Ohta, Yu-Ichi, Takeo Kanade, and Toshiyuki Sakai. "Color information for region segmentation." Computer graphics and image processing 13.3 (1980): 222-241.
Shaoqing Ren, Kaiming He, Ross Girshick, and Jian Sun, "Faster R-CNN: Towards Real-Time Object Detection with Region Proposal Networks Faster", IEEE Transactions on Pattern Analysis and Machine Intelligence, vol. 39 Issue 6, Jun. 2017.

* cited by examiner

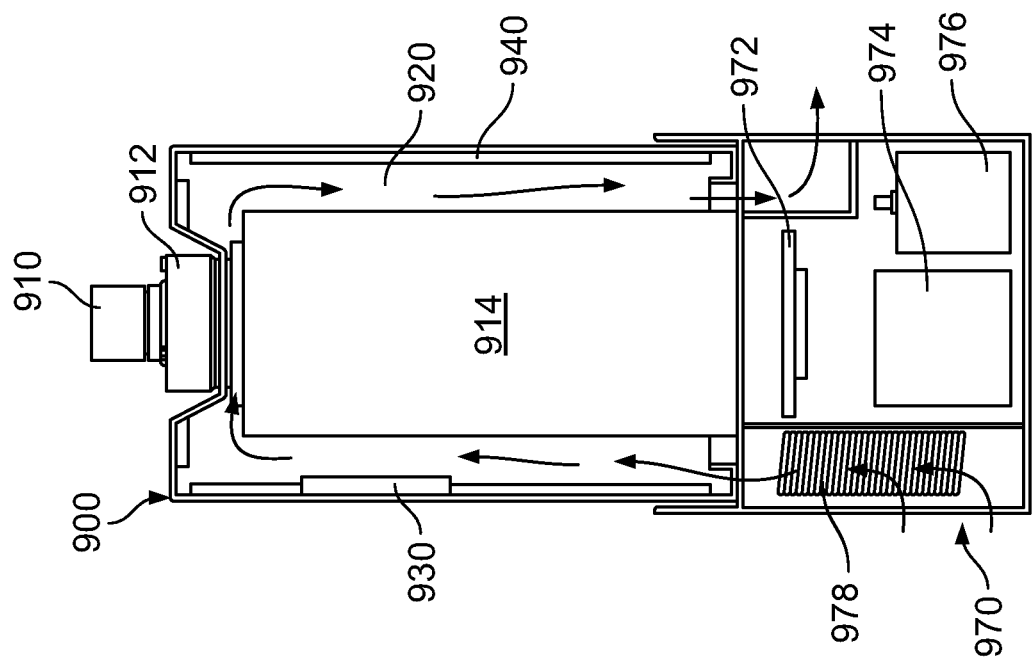
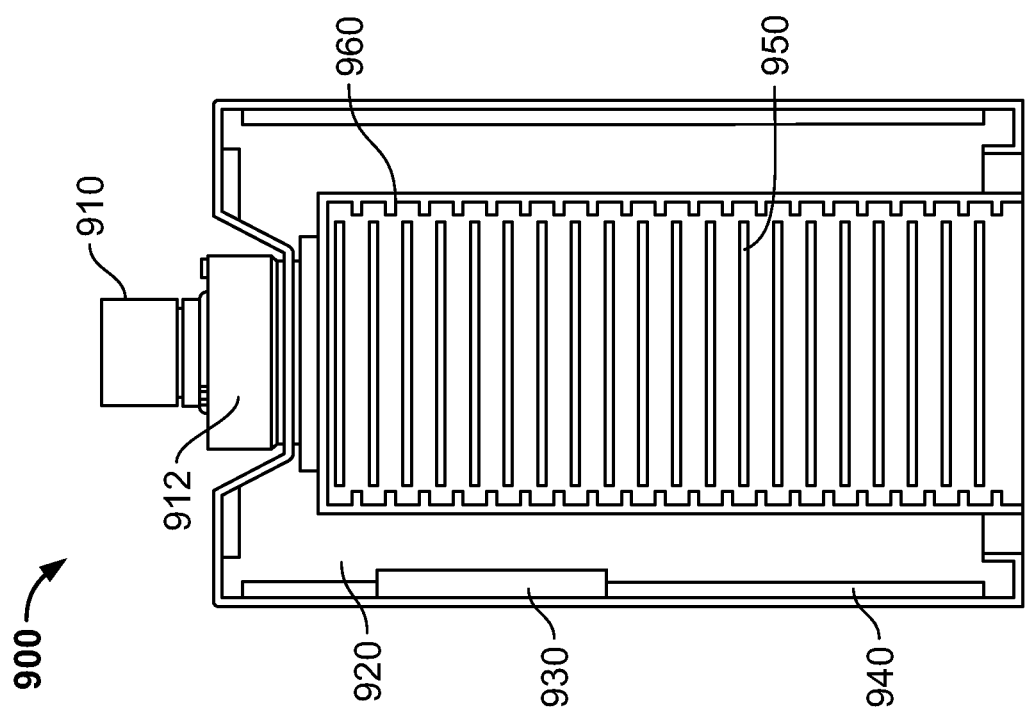

ROBOTIC SLED-ENHANCED FOOD PREPARATION SYSTEM AND RELATED METHODS

CROSS-REFERENCE TO RELATED APPLICATIONS

This application claims the benefit of U.S. Provisional Application No. 62/633,589, filed Feb. 21, 2018, and is a continuation-in-part application of U.S. patent application Ser. No. 16/100,889, filed Aug. 10, 2018, and claims the benefit of U.S. Provisional Application No. 62/592,130, filed Nov. 29, 2017; and this application is a continuation-in-part application of International Patent Application No. PCT/US2018/21066, filed Mar. 6, 2018; and a continuation-in-part application of International Patent Application No. PCT/US2018/20948, filed Mar. 5, 2018, and claims the benefit of U.S. Provisional Application No. 62/467,735, filed Mar. 6, 2017; and of U.S. Provisional Application No. 62/467,743, filed Mar. 6, 2017, the entire contents of which are incorporated by reference.

BACKGROUND

1. Field of the Invention

This invention generally relates to food processing, and more particularly, to food processing using systems adapted for automatically performing kitchen-related tasks.

2. Description of the Related Art

Providing a robust and effective apparatus to prepare food for consumers is challenging because of the wide variety of types of food, cooking techniques, kitchen appliances, kitchen tools, and utensils.

Food preparation is often labor intensive and subject to human error. Workers employed by these businesses require careful and sometimes excessive training to accurately and safely prepare the food, thus increasing costs. Businesses that prepare and sell food typically have high labor costs and experience large amounts of monetary and food loss as well as customer dissatisfaction due to human error.

Various commercial food preparation equipment addresses some of the above-mentioned challenges.

An example of one type of food preparation equipment is a clamshell-type grill, a device to grill both sides of food items simultaneously, typically in large batches. The resulting cooked food items are then typically placed into a warming drawer prior to serving. A commercial example of this device is the ProGrill SL1557P, manufactured by the ProLuxe Company (Perris, Calif.).

Another example of food preparation equipment is the conveyor fryer for French fries and other foods that are cooked using a frying process. The conveyor serves to benefit the cooking process by removing human error associated with timing, thereby improving consistency and throughput. This device generally comprises a large vat of oil that is heated and a system of mesh screens attached to a conveyor belt that move food items through the oil at a predetermined rate. Fried food items are then dispensed at the other end of the device. Kitchen workers place uncooked items into one side and retrieve cooked items on the other side. A commercial example of this device is the MasterMatic Compact Fryer, Model 350, manufactured by the Heat and Control Company (Hayward, Calif.).

The above described food preparation equipment, however, has multiple limitations. For example, such equipment is limited to only one type of food. A clamshell grill, for instance, does not allow food items to be cooked to different levels in a single batch. Similarly, a conveyor-type fryer, can only be configured for cooking one type of item at a time as the cooking time is set by the speed of the conveyor belt. Consequently, it cannot be used to prepare more than one type of food unless the different types of food happen to have the same cooking time requirements.

Second, such food preparation equipment typically requires batch preparation of food items. For example, clamshell grills are typically designed to prepare multiple food items in batches and are not useful for preparing items individually.

Third, the increased mechanical and/or electrical complexity inherent in such devices often leads to increased failure rates versus conventional, non-automated versions of such devices, resulting in higher downtimes. Such downtimes can be especially costly for restaurants because restaurants do not typically have back-up equipment onsite and consequently they may not be able to cook a number of items on their menu which reduces average order size or even drives away potential customers.

Fourth, such food preparation equipment typically has a large footprint compared to conventional versions of the equipment and for the variety of items they are capable of cooking. This larger size is a challenge for restaurant owners because of the high cost of kitchen space. For example, the above mentioned MasterMatic fryer is substantially larger than a similar model without the automatic conveyor.

Fifth, the potential benefits of such food preparation equipment are often outweighed by their associated upfront costs. For example, automated frying equipment is significantly more expensive than conventional frying equipment.

Sixth, such food preparation equipment still requires workers to frequently bring food from storage areas for preparation, which necessitates close monitoring by and significant effort from human workers and is subject to human error which may cause delays in food production.

These drawbacks present significant challenges to restaurant operators and are not consistent with consumer preferences for a wide variety of freshly cooked food and a restaurant's need for high reliability.

Other food preparation equipment addresses some of the above-mentioned challenges. For example, U.S. Pat. No. 5,389,764 to Nishii et al. (the '764 Patent) describes a cooking appliance that controls a cooking device on the basis of temperature information of an object to be cooked that is estimated from changes in physical characteristics. A neural network is taught, for a number of categories of food that are classified according to the temperature of the cooked and completed food, the relationship between changes in the physical characteristic, such as the temperature and humidity, generated during heating of the object to be cooked during cooking, and changes in temperature of the object at the center of the object and the surface of the object in order to provide for an automatic cooking operation.

Although the '764 Patent provides some degree of cooking automation, the described appliance requires the kitchen worker to identify the type of food and place the food within a cooking chamber. Additionally, the worker must also retrieve food from storage when local supplies at the point of food preparation are exhausted.

In contrast, what is desired is a more robust system that may serve in a kitchen environment for preparing multiple types of food (perhaps newly placed or unknown food items), on a range of different types of cooking equipment, without being required to be placed in a controlled chamber, and with minimal human effort.

Additionally, kitchen environments can vary widely and have a number of challenges which make automating food preparation processes difficult. For example, food preparation processes typically use high volumes of ingredients. As such, ingredients are stored both locally at the point of preparation and in storage areas that are often located in separate rooms. Additionally, some ingredients may need to be stored under controlled temperatures, such as in refrigerators, necessitating the use of local refrigeration and additional refrigeration in storage areas. As food preparation is performed, local stores of ingredients must be monitored and replenished from supplies in storage areas. This replenishment processes requires locating those ingredients (or containers containing those ingredients) in storage areas and moving them to local storage at the point of preparation, which may be in a separate room.

Similar to the previous example, food preparation steps also typically create waste that must be removed from the food preparation area and disposed. Such waste includes but is not limited to portions of food items, used cooking oil, packaging, and incorrectly product orders.

Another example of the challenges of automating food preparation in kitchens is identifying and locating individual food items during the food preparation process, which is challenging in kitchen environments. One reason that identifying and locating food items is challenging because work surfaces in kitchen environments can have appearances that change rapidly. A griddle commonly used to cook items such as hamburger patties, chicken breasts, onions, and steaks, rapidly accumulates residuals such as grease, liquids, and particles from the food prepared on it. Due to high temperatures, these residuals are quickly carbonized, creating dark surfaces on the griddle which make automatic recognition of the food challenging in at least two ways: 1) they reduce the contrast between the food items to be identified and the work surface; and 2) they create an underlying source of variability in any sensor data that is collected.

Gases created during the cooking process also make collecting accurate sensor data difficult. Specifically, water and grease from food items and cooking surfaces may collect on sensors and obscure readings resulting in reduced signal to noise ratios for the affected sensors. Taken together, these challenges make obtaining accurate sensor data difficult.

Another challenge that makes automating kitchen processes challenging is the presence of human kitchen workers. Automation solutions in kitchens typically need to operate in close proximity to and oftentimes in collaboration with human kitchen workers. As a result, automation solutions must be able to operate safely around human kitchen workers and enable close collaboration in the preparation of food items.

Consequently, there is still a need for improved systems and methods for automating preparation of food in commercial kitchen environments, especially in restaurant kitchens.

SUMMARY OF THE INVENTION

Embodiments of the invention are directed to a robotic sled-enhanced food preparation system comprising a robotic kitchen assistant operable to perform food preparation steps and a robotic sled capable of supplying the robotic kitchen assistant with food items.

In a preferred embodiment, the robotic kitchen assistant evaluates food inventory levels and automatically determines when to replenish the food inventory levels if the food inventory levels are insufficient to complete the food preparation steps. If the food inventory levels are insufficient, the sled is instructed to pick up a food supply container and return it to the robotic kitchen assistant for use in the food preparation steps.

In embodiments of the invention, a food preparation system includes: a) a robotic arm and associated support stand, sensors, and electronics, placed in proximity to food preparation equipment and capable of performing food preparation tasks; b) a mobile sled capable of supplying the robotic arm with items for the food preparation process; c) various cameras and sensors for collecting data; and d) a processor operable to manage the timing and logistics of the food preparation system based on the data from the cameras and sensors, orders, and various other variables.

In embodiments of the invention, the robotic kitchen assistant includes a scheduling engine to determine when to perform each of the food preparation steps based on a number of categories of variables or inputs. Categories comprise demand, current food level inventory, and production capacity.

In embodiments of the invention, the robotic kitchen assistant monitors the food inventory levels and automatically replenishes the inventory levels when the inventory levels are insufficient to support the food preparation steps.

In embodiments of the invention, a kitchen food inventory and logistics system comprises a robotic kitchen assistant including a robotic arm, a plurality of canisters adapted to hold food, and a robotic sled operable to collect and transport the canister to the robotic kitchen assistant, and optionally, to transport the robotic kitchen assistant itself to a desired location in the kitchen.

In embodiments of the invention, a method for maintaining food inventory comprises evaluating whether inventory at the point of food preparation is sufficient and automatically distributing at least one food supply canister to a robotic kitchen assistant via a mobile sled.

The description, objects and advantages of embodiments of the present invention will become apparent from the detailed description to follow, together with the accompanying drawings.

BRIEF DESCRIPTION OF THE DRAWINGS

The above-mentioned aspects, as well as other features, aspects and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise.

FIG. 9A illustrates a food canister in accordance with one embodiment of the invention;

FIG. 9B illustrates a food canister and a refrigerated base in accordance with one embodiment of the invention;

DETAILED DESCRIPTION

Figure 1:
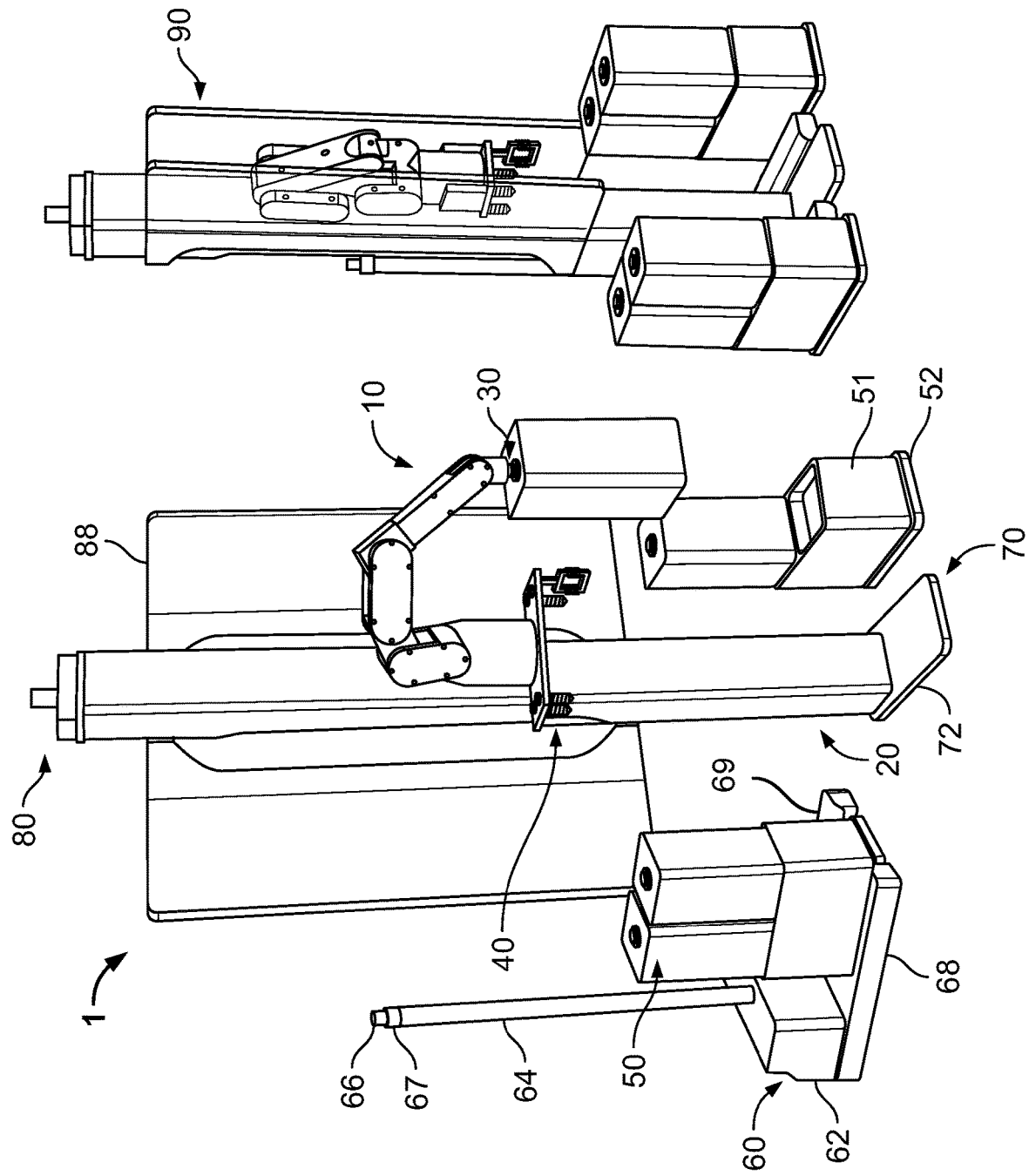
FIG. 1 is a perspective view of a food preparation system including a robotic kitchen assistant, containers, and sleds in accordance with an embodiment of the invention.

It is to be understood that the embodiments of the invention described herein are not limited to particular variations set forth herein as various changes or modifications may be made to the embodiments of the invention described and equivalents may be substituted without departing from the spirit and scope of the embodiments of the invention. As will be apparent to those of skill in the art upon reading this disclosure, each of the individual embodiments described and illustrated herein has discrete components and features that may be readily separated from or combined with the features of any of the other several embodiments without departing from the scope or spirit of the embodiments of the present invention. In addition, many modifications may be made to adapt a particular situation, material, composition of matter, process, process act(s) or step(s) to the objective(s), spirit or scope of the embodiments of the present invention. All such modifications are intended to be within the scope of the claims made herein.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It will also be understood that, although the terms first, second, etc. may be used herein to describe various elements, these elements should not be limited by these terms. These terms are only used to distinguish one element from another. Thus, a first element could be termed a second element without departing from the teachings of the present invention.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

All existing subject matter mentioned herein (e.g., publications, patents, patent applications and hardware) is incorporated by reference herein in its entirety except insofar as the subject matter may conflict with that of the present invention (in which case what is present herein shall prevail).

The following patents and applications are incorporated by reference in their entirety: PCT Publication No. 2018165105, entitled "ROBOTIC KITCHEN ASSISTANT FOR PREPARING FOOD ITEMS IN A COMMERCIAL KITCHEN AND RELATED METHODS", filed Mar. 6, 2018; PCT Publication No. 2018165038, entitled "AUGMENTED REALITY-ENHANCED FOOD PREPARATION SYSTEM AND RELATED METHODS", filed Mar. 5, 2018; US Publication No. 20180345485, entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS", filed Aug. 10, 2018.

Describes herein are flexible robotic food preparation systems for a kitchen environment.

FIG. 1

With reference to FIG. 1, a food preparation system 1 is shown in accordance with one embodiment of the invention. FIG. 1 shows a robotic kitchen assistant 70 including a robotic arm 10 mounted on a stand 20. The robotic arm 10 includes an end effector 30 capable of grasping tools from the tool changer 40. The robotic kitchen assistant 70 can also include a camera or sensor, and a processor to receive the data from the camera and sensor and to manage operation of the robotic arm, and other components of the food preparation system as discussed herein. Such cameras and sensors may be mounted or coupled directly to the robotic kitchen assistant or located elsewhere in the kitchen.

FIG. 1 also shows supply containers 50 which contain food items necessary for food preparation. Examples of food items include, without limitation, raw ingredients, ingredients, seasonings, oils, and prepared foods. In embodiments, food items include without limitation food packaging, cleaning materials, and disposable materials for food handling.

FIG. 1 also shows container supports 51 to hold one or more of the supply containers 50. Each of the supply containers 50 may be located or registered in a cavity or slot of the support 51. In embodiments, as described further herein, the container support 51 is configured as a refrigerated base (e.g., 970 of FIG. 9B) to provide power and cooling to the containers.

Also shown in FIG. 1 is a sled 60. The sled 60, as described further herein, is capable of moving supply containers/canisters and other equipment for food storage and waste, as well as, in some implementations, moving the robotic arm and stand itself. In embodiments, the sled 60 is autonomous or semi-autonomous to operate with the robotic arm, food work station, human workers, food storage environments, etc. The sled 60 may deliver raw food items to the robotic kitchen arm in a timely and efficient manner as described further herein. The sled 60 may also remove waste items from where the robotic kitchen arm is operating in a timely and efficient manner as described further herein.

Not shown in FIG. 1 is a food preparation area which may include food processing equipment such as a griddle where food items can be cooked, a food workstation such as a cart where food items can be stored, or a prepping station where food items can be cleaned and chopped for cooking on the griddle, added to a deep fryer, or otherwise cooked as the case may be. Examples of food preparation areas are described in PCT Publication No. 2018165105, entitled "ROBOTIC KITCHEN ASSISTANT FOR PREPARING FOOD ITEMS IN A COMMERCIAL KITCHEN AND RELATED METHODS", filed Mar. 6, 2018, the contents of which are incorporated by reference in its entirety.

Sled 60 can include a wide variety of components such as, for example, 1) an onboard battery; 2) an electric powertrain; 3) wheels/tracks, optionally preferably suited for slippery floors; 4) on board processing, such as a programmed processor, and a memory, which in combination are operable to navigate and manipulate the sled as described further herein; 5) 3D lidar; 6) cameras; 7) a wide range of sensors such as an IMU (inertial measurement unit: accelerometer, and other types of sensors) or a 8) force sensor to confirm engagement of sled and item; 9) current status lights; and 10) a lifting interface.

Additionally, a communication interface in the sled enables the sled to receive commands and send data to a central computer (whether the central computer is part of the robotic kitchen assistant or not) or to a local or remote server. Wireless communication can include, without limitation, near or far wireless communication technologies.

The sled 60 shown in FIG. 1 has an enclosure 62 for housing some of the components described above such as the motor, processor, memory, battery, etc.

The sled 60 is also shown with a vertical riser 64 terminating at a sensor array or camera 66. The camera or array 66 is raised to a height preferably sufficient to be able to see food items in the kitchen environment, as well as see on top of counter-tops and other appliances in a kitchen environment. Sensor and cameras 66 send data to the processor for navigating the sled including avoiding obstacles (e.g., humans) in its route to the target location.

Additionally, a status light 67 is shown on sled to indicate states of operation of the sled such as pick up or movement described further herein. An antenna may also be included along the riser or status light area.

In embodiments, the sled includes a pair of arms 68, 69 extending from housing 62. This fork-shaped base defines a capture zone to slidably engage a holding plate 52, 72, which holds or is otherwise secured to the items to be transported such as, for example, the storage container 50, refrigeration support 51, and the robotic kitchen assistant 70. In embodiments, each arm features an elongated slot which mates with a side of the base plate (e.g., base plates 52, 72) of the target item to be transported. In embodiments, actuators positioned in the arms are used to securely hold the holding plate. The above-mentioned wheels, rollers or belts can be operably mounted under each of the arms to make the sled mobile.

Additional examples of mobile transport units and components of transports units for moving inventory items in a warehouse environment are described U.S. Pat. Nos. 7,920,962, 10,112,771, each of which is incorporated by reference in its entirety.

With reference again to FIG. 1, a mounting foot 72 of the stand 20 interfaces with coupling units in the floor (not shown, and described further herein) to ensure strong support. The system is also shown including a status light 80 mounted to the stand and optional safety barrier 88.

In some implementations such as the embodiment shown in FIG. 1, the safety barrier 88 is capable of folding into a second configuration 90 to cover the robotic arm. In some implementations, the safety barrier is transparent and capable of displaying information related to the system, such as status, upcoming movements, and progress completing food preparation tasks.

Although not shown in FIG. 1, the robotic kitchen assistants can be placed adjacent to one or more food workstations. Examples of food workstations include, without limitation, food preparation equipment, food carts, and storage units for food supplies. Also not visible in FIG. 1 is a computer with a processor operable or programmed to run various algorithms to support the food preparation system, including scheduling algorithms. Also, not visible in FIG. 1 is arrays of cameras and sensors placed inside and outside the workstation area to monitor relevant items (e.g., food inventory levels in cold storage, employee locations and activities, number of customers in the dining area) and to improve system performance.

Cameras and sensors may be positioned or physically coupled to the robotic kitchen assistant itself, the food workstation, or the sled. Alternatively, or in addition to, cameras and sensors may be positioned remote from the robotic kitchen assistant, the food workstation, and the sled.

Details of sensors, programmed processors, algorithms, and other components and functionality useful in the subject invention are described in PCT Publication No. 2018165105, entitled "ROBOTIC KITCHEN ASSISTANT FOR PREPARING FOOD ITEMS IN A COMMERCIAL KITCHEN AND RELATED METHODS", filed Mar. 6, 2018; PCT Publication No. 2018165038, entitled "AUGMENTED REALITY-ENHANCED FOOD PREPARATION SYSTEM AND RELATED METHODS", filed Mar. 5, 2018; US Publication No. 20180345485, entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS", filed Aug. 10, 2018, each of which is incorporated by reference in its entirety.

FIG. 2

Figure 2:
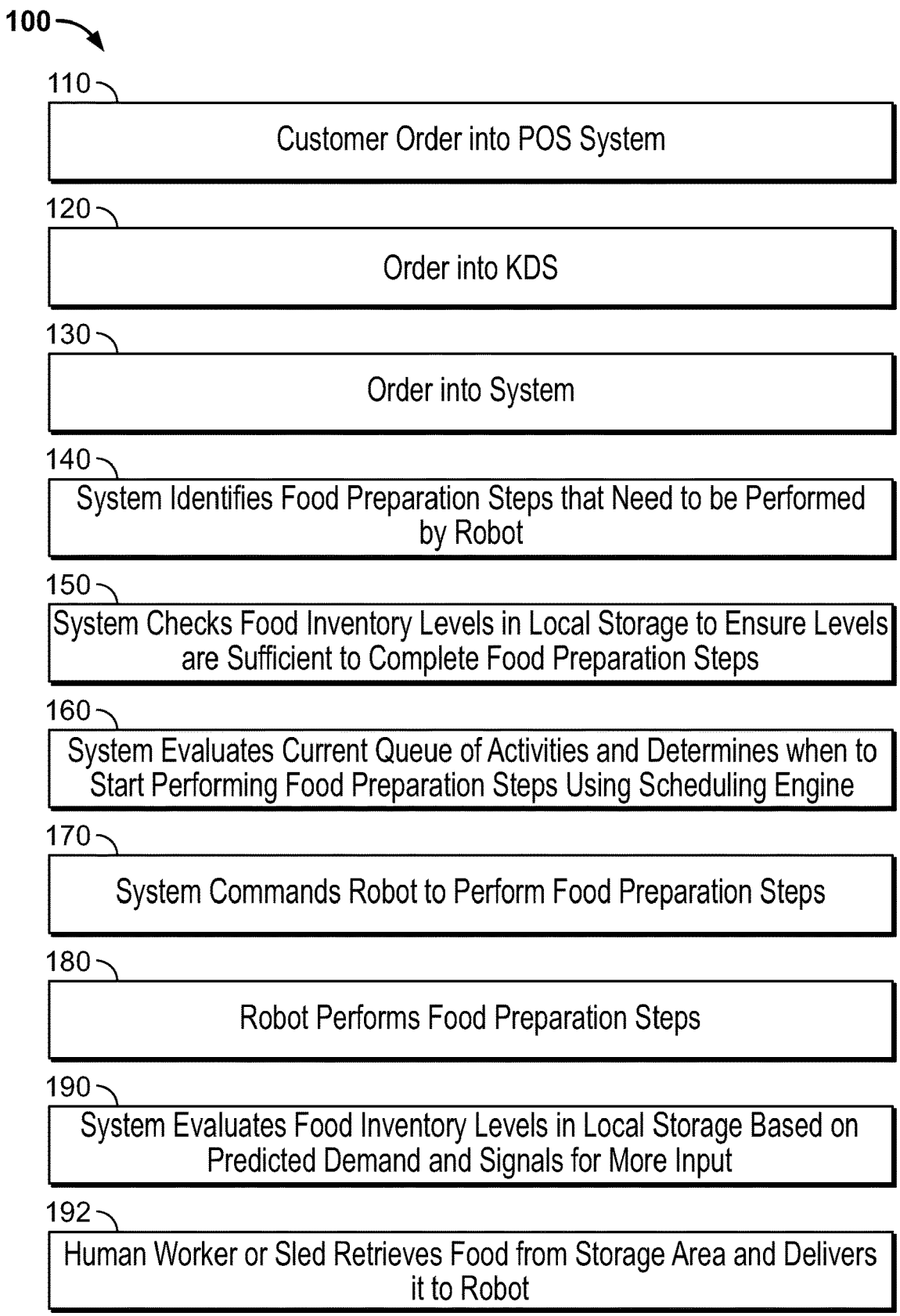
FIG. 2 is a flow diagram of a method for preparing and replenishing food in accordance with an embodiment of the invention.

A method 100 for food preparation responsive to a customer order is described in FIG. 2.

Step 110 states the customer order is received by a restaurant's Point Of Sale (POS) system.

Step 120 states the customer order is then transmitted to a restaurant's Kitchen Display System (KDS). In some implementations, including those where a restaurant does not have a KDS system, this step is not included in the process and the method proceeds directly to the next step.

Step 130 states the order is received. In embodiments, the order is received by the robotic kitchen assistant.

Step 140 states the robotic kitchen assistant determines which food preparation steps of the order will be completed by the robotic kitchen assistant and which steps shall be otherwise completed such as, e.g., by a human.

Step 150 states the robotic kitchen assistant checks food inventory levels at its workstation as well as the status of preparation equipment and utensils.

In embodiments, the temperature and conditions of the food items stored in inventory are monitored by the robotic kitchen assistant.

In embodiments the robotic kitchen assistant also is operable to signal when an item needs to be replaced or its storage conditions need to be changed. In particular embodiments, the robotic kitchen assistant monitors the condition of food items to ensure that they are fit for food preparation. One such condition that the system can monitor is temperature.

In the event the food levels are not sufficient to begin preparing the order (whether due to quantity, quality, or otherwise), the method skips steps 160-180, and proceeds directly to step 190, described below, to obtain more food. After obtaining more food, the process returns to step 150.

Step 160 states to determine when to start performing food preparation steps. Particularly, in the event that the food levels are sufficient to begin preparing an order, the method proceeds to step 160 and evaluates the current queue of activities to determine when to start performing food preparation steps.

Scheduling Engine/Module

In a preferred embodiment, step 160 is performed using a scheduling engine to evaluate the current queue of activities to determine when to start performing food preparation steps. In embodiments, the scheduling engine is operable to analyze other factors to determine when to begin various food preparation steps, including but not limited to: presence of necessary ingredients, status of preparation equipment (grill temperature and oil temperature, for instance), availability of human workers, activities of human workers, time to receive additional supplies (if needed), potential future demand, etc. In some implementations, the scheduling engine is implemented with traditional scheduling algorithms, known to those skilled in the art. In some implementations, a neural network-based approach is used. In such a case, algorithms are of the form described in Glaubius, Robert, et. al., "Real-Time Scheduling via Reinforcement Learning", Proceedings of the Twenty-Sixth Conference on Uncertainty in Artificial Intelligence (UAI2010). In implementations, imitation learning-based algorithms are used.

The scheduling engine may compute the food preparation steps based on a wide range of variables some of which may be categorized as follows: demand; status of the current inventory; and production capacity.

Demand may be predicated from various inputs including, for example: order history at current restaurant location; order history at other restaurant locations; order history broken down by time, date, holiday schedule, and/or local events; data from sensors including cameras that estimate the number of customers in the restaurant and/or entering the restaurant; data from sensory including cameras that estimates the number of cars in the restaurant parking lot; external data on the number of potential customers for the restaurant; food loss rate due to the preparation process; data on remaining preparation times for food items; measurements with infrared cameras of foods being prepared; estimates of internal temperature of food items; and estimates of when preparation of various food items will be completed based on recipes, infrared measurements, visual measurements of food shape and volume, and/or food preparation equipment parameters.

Variables related to the status of the current inventory can include but are not limited to: time or preparation for each batch (e.g., fries) that makes up the current inventory; viable 'lifetime' of cooked french fries (i.e., how long do they last before becoming unacceptable to customers); weight of total remaining cooked items, visual assessment of remaining amount of cooked items using visible, IR, and 3D sensor measurements; infrared measurements of remaining cooked french fries to discern estimated temperature; estimates of internal temperature of remaining french fries using measurements and modeling; direct measurements of internal temperature of selected food items, using a temperature probe that is placed directly in the food while it is in the oil, wherein the food item is selected to be either representative of the food items being prepared or selected because it is likely to take the longest to cook; and, measurements of the amount of fries remaining and their physical characteristics obtained by using the robotic arm to touch various items and then measuring force applied and their resulting deformation.

Variables related to current and future production capacity can include but are not limited to: capacity of food preparation equipment such as the fryer and cooked french fry storage area, as a function of time; availability of uncooked french fries at workstation; availability and timing for sled or human worker to deliver additional uncooked french fries; oil temperature in the fryer; and, other orders (current and predicted to be upcoming) that require use of the fryer or other relevant equipment.

Indeed, scheduling the food preparation tasks are based on a wide range of variables. Once the scheduling of the food preparation tasks are computed, the method proceeds to the next step.

Step 170 states to command the robotic kitchen assistant to perform the food preparation steps 170. Step 170 is preferably performed after the various steps necessary to perform the food production are scheduled (including such auxiliary tasks as obtaining additional food items).

Step 180 states the robotic kitchen assistant begins performing the food preparation steps. Although the invention includes working in collaboration with human workers, in embodiments, the robotic kitchen assistant is wholly autonomous, for example, it can perform the food preparation steps based on the order received and the steps described above without any input from restaurant personnel subsequent to the order.

Step 190 states to evaluate food inventory levels. As the food is being prepared, the robotic kitchen assistant can again check necessary food inventory levels and likely food inventory levels in the future based on a wide range of variables and methods as described herein.

Step 192 states to deliver food from storage to the robotic kitchen assistant. If necessary, food is delivered to the robotic kitchen assistant's workstation by either a human worker, an autonomous sled, or otherwise.

In a preferred embodiment, food is picked up from a storage and placed into the food workstation near the robotic kitchen assistant by its robotic arm. In another preferred embodiment, food items are picked up by an autonomous sled, and the sled transports food items to the workstation in the vicinity of the robotic arm. The sled can be scheduled based on multiple variables, including, but not limited to: other tasks the sled is commanded to perform, and/or potential obstructions or delays in the sled's path, e.g., employees, equipment, and supplies. In embodiments, the sled carries prepared food directly to the customer in the restaurant.

In embodiments, and as discussed in more detail in connection with FIG. 3 below, the food preparation system can be configured to automatically replenish food items necessary to perform food preparation steps. In embodiments, the robotic kitchen assistant can constantly monitor food item levels and can order more food items from storage as needed. In other embodiments, the robotic kitchen assistant monitors food levels periodically.

Waste Removal. In embodiments, the robotic kitchen assistant is capable of removing waste generated by food preparation steps. Examples of waste include without limitation: food items, portions of food items, fragments of food items, food items not acceptable for use in food preparation, spoiled food items, fryer oil, packaging, wipes used to clean surfaces, and coverings for manipulators or utensils. In an embodiment, the robotic arm picks up and places the target item in a waste receptable, and optionally, a sled transports the waste receptable to another location for receiving the waste.

Oil Change. In embodiments, the system is capable of changing the oil in a fryer using a supply container. In the embodiment, the fryer oil is drained into a supply container which can then be transported to a storage area for disposal or recycling. In embodiments, the robotic kitchen assistant is capable of monitoring waste levels and scheduling a sled to remove the waste when necessary.

Cleaning. In embodiments, the system is operable to clean. In a preferred embodiment the robotic kitchen assistant includes cleaning tools such as spray nozzles connected to water capable of cleaning the system. In embodiments, the spray nozzle is attached to an end effector which can be employed by the system's robotic arm. In embodiments, a nozzle that blows compressed air is attached to an end effector to assist with cleaning or drying or both. In embodiments, the system has a wash container with jets that the arm and end effector can be inserted into to get washed with jets of water.

Packaging. In embodiments, one or more robotic kitchen assistants may perform packaging of foods. For example, a completed hamburger could be placed into a clamshell paper container.

It is to be understood that although a particular set of steps and sequence is listed above, the invention is not intended to be so limited except as where recited in the appended claims. The invention may perform more or less steps, and the steps may be performed in any logical sequence or in parallel to improve the efficiency of the system and except where such steps are exclusive to one another.

FIG. 3

Figure 3:
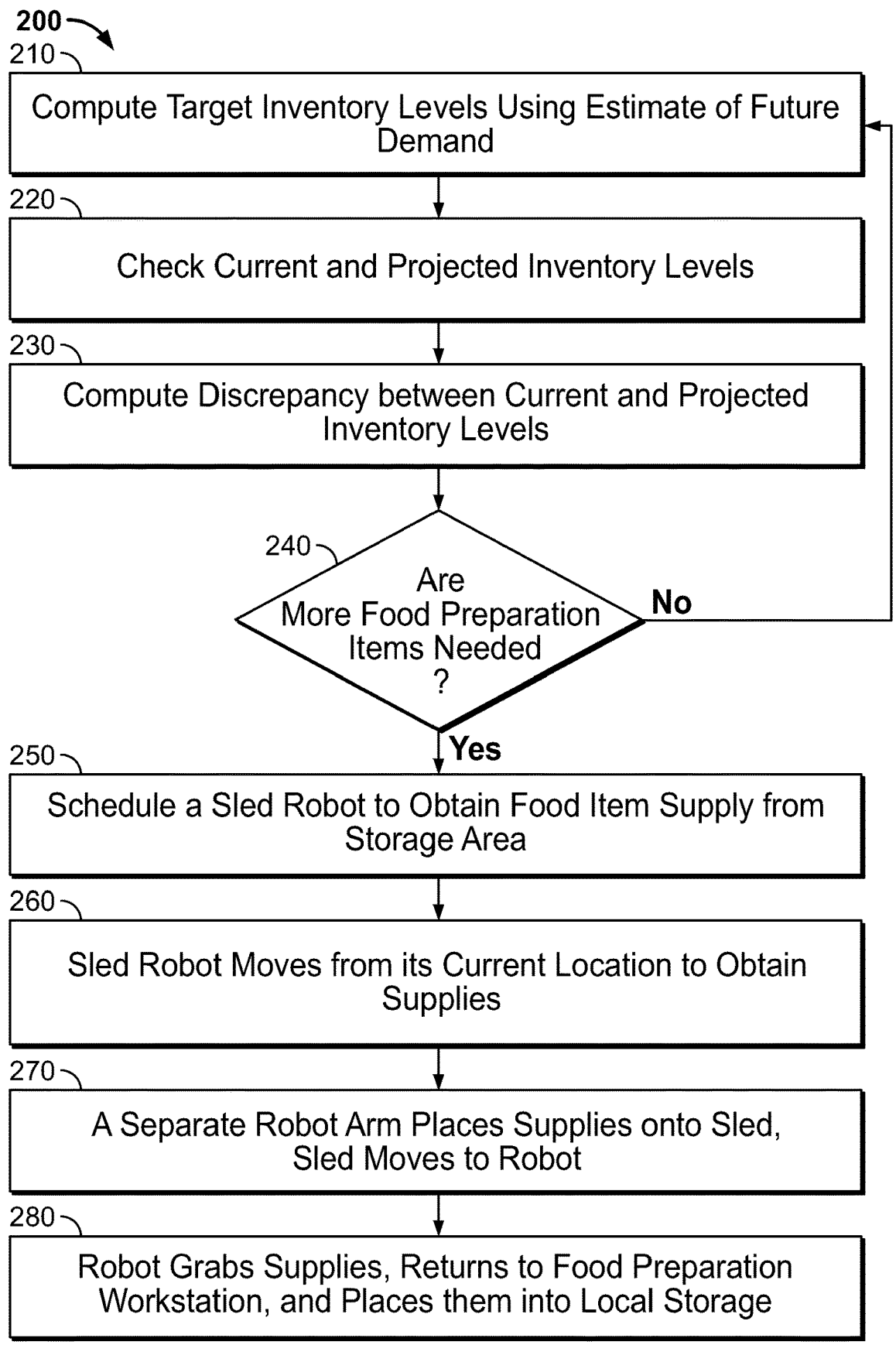
FIG. 3 is a flow diagram of a method for automatically maintaining food inventory levels in accordance with an embodiment of the invention.

FIG. 3 is a flow chart illustrating a method 200 to monitor and automatically replenish food item supplies in accordance with an embodiment of the invention.

Step 210 states to compute target inventory. This step may be performed by computing an estimate of future demand by a processor or computer (e.g., an onboard computer at the robotic kitchen assistant) as described above in connection with FIG. 2.

Step 220 states to check current inventory levels. In embodiments, the inventory corresponds to inventory of the food supplies in the workstation or local storage in the vicinity of a first robotic kitchen assistant. This step may be performed by a processor or computer (e.g., an onboard computer at the robotic kitchen assistant) as described above in connection with FIG. 2.

Step 230 states to compute the discrepancy between current and projected inventory levels. This step may be performed by the robotic kitchen assistant described herein. An example of an output of step 230 is the current inventory will be short by five items in four minutes time. At this point, an additional delivery of food items would be scheduled from storage so that sufficient inventory is available to prepare the items projected to be required.

Steps 240 states to query whether more food preparation items are needed. In embodiments, current and projected food inventory levels are constantly monitored (e.g., constantly queried) to maximize efficiency. If the inventory is determined to be short of a food item, the subject method moves ahead to step 250, discussed below. If the inventory is determined to sufficient, the method returns to step 210. This step may be performed by the robotic kitchen assistant described herein.

Step 250 states to schedule a supply run by a sled to a storage area. This step may be performed by a scheduling engine based on a number of variables as described above in connection with FIG. 2. Examples of variables include without limitation: location of food items, urgency of the food item for the preparation step, probability of employees being in the way of the sled as a result of their other activities, etc.

Step 260 states to obtain the food item supplies from storage. This step may be performed by a sled as described further herein. The storage may be a second workstation or robotic kitchen assistant, a storage refrigerator, storage containers, etc.

Step 270 states a second (separate) robot arm places supplies onto the sled. And the sled returns to the first robot.

Step 280 states to grab the food item supplies, place them in the food preparation workstation, and/or into local storage for use by a first robot. In a particular embodiment, food is replenished in refrigerated drawers located near the robotic arm.

As described above, the food preparation system can be configured to constantly and automatically maintain certain inventory levels of foods that it prepares. Examples of such foods may include without limitation cooked french fries, cooked fried chicken, hot dogs, and cooked chicken fingers.

Additionally, in embodiments, these foods may be packaged and given to customers by human workers. For example, the food preparation system may be configured to maintain an inventory of cooked french fries sufficient to satisfy a restaurant's incoming orders. In this case, the food preparation system can use the predictive algorithms as mentioned herein for estimating demand, evaluating current inventory and useful life of cooked french fries, and predicting upcoming production capacity. In embodiments, a processor, computer or server of the food preparation system is programmed to use a predictive analysis to identify when inventory shall run out of food items necessary to perform the food preparation steps.

FIG. 4

Figure 4:
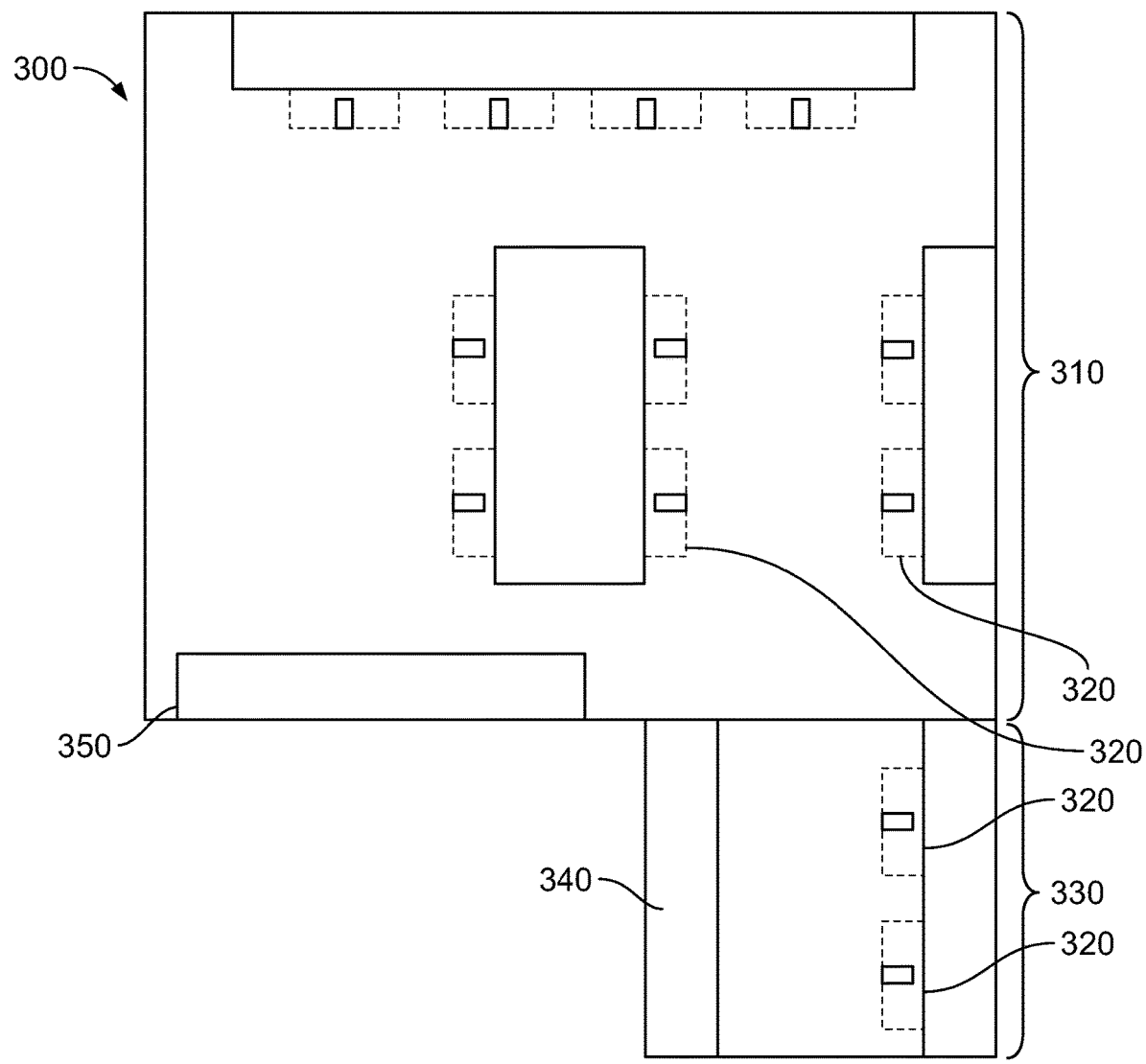
FIG. 4 illustrates a layout of a kitchen environment showing preferred locations of components of a food preparation system in accordance with an embodiment of the invention.

FIG. 4 shows a food preparation environment 300 including a kitchen 310, a plurality of workstations 320, cold storage 330, and food storage 340. As described herein, it is desirable to maintain food input levels at the workstations 320. In embodiments, a sled (not shown) can be adapted to travel between various locations in order to reposition the robotic arm (not shown) at a particular workstation 320, pick up supplies in, e.g., cold storage 330 (with such supplies being loaded by another robotic kitchen assistant in some implementations) or food storage 340. The sled may also be configured to move storage canisters to an area for cleaning, and/or charging (350). The sled may also move for repositioning itself.

In embodiments, food preparation systems are operable to prepare the food as well as to perform one or more of the following tasks: removal of food items from original packaging, placement of removed food items into new packaging and/or containers that are easily able to be manipulated by robotic end effectors, picking up and placing storage canisters and/or containers, cleaning storage containers and/or other items, moving food items in their original packaging, and placing food preparation-related items onto the robotic sled.

FIGS. 5A-5C

Figure 5A:
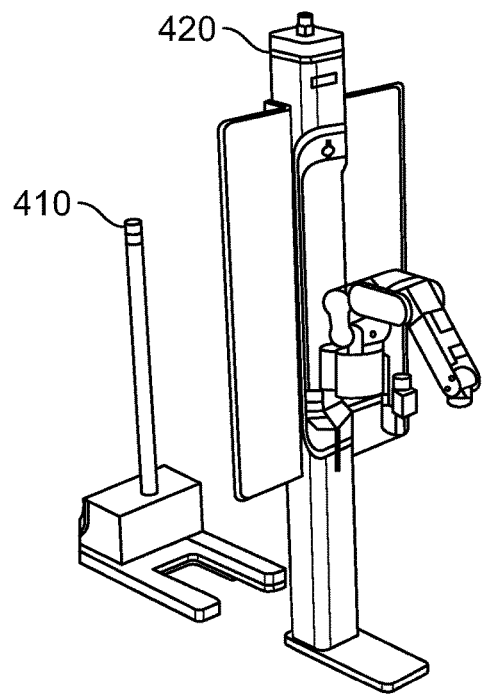
FIGS. 5A-5C sequentially illustrate a sled picking up and moving a robotic arm assembly in accordance with an embodiment of the invention.
Figure 5C:
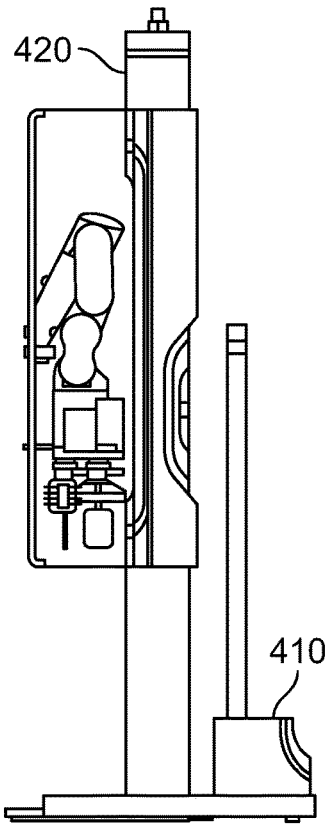
Figure 5B:
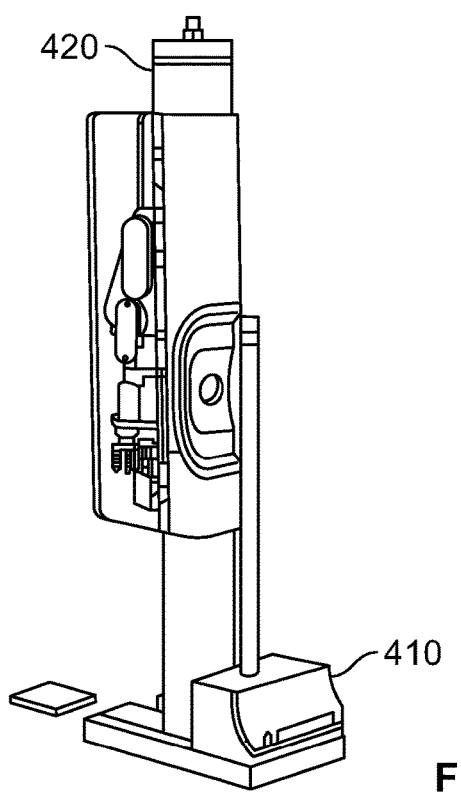
Figure 6D:
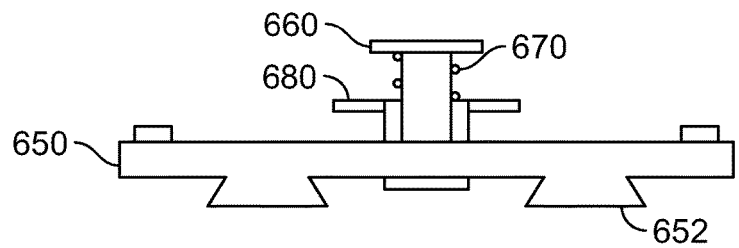
FIG. 6D is an end view of a robot mount adapted to interlock with the mounting plate shown in FIGS. 6B, 6C.
Figure 6A:
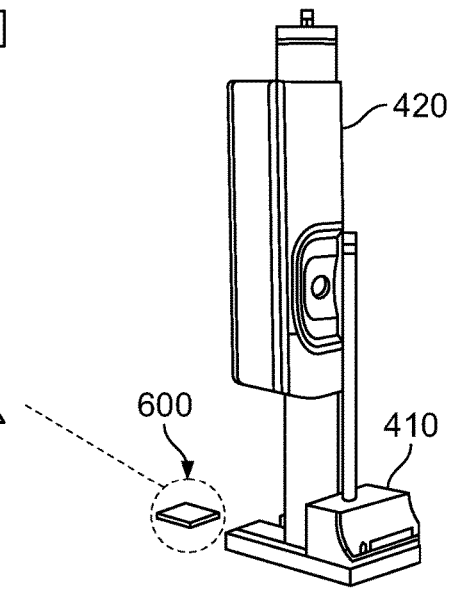
FIG. 6A illustrates a perspective view of a sled carrying a robotic arm assembly and an adjacent mounting plate affixed to the floor.
Figure 6C:
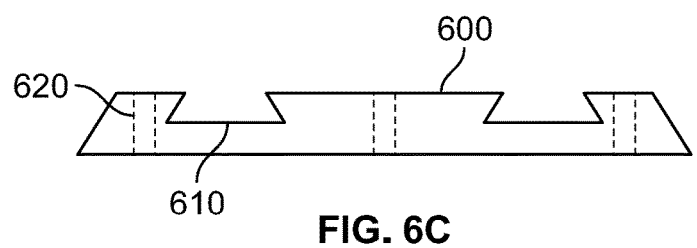
FIGS. 6B, 6C are top and end views, respectively, of the floor plate shown in FIG. 6A.
Figure 6B:
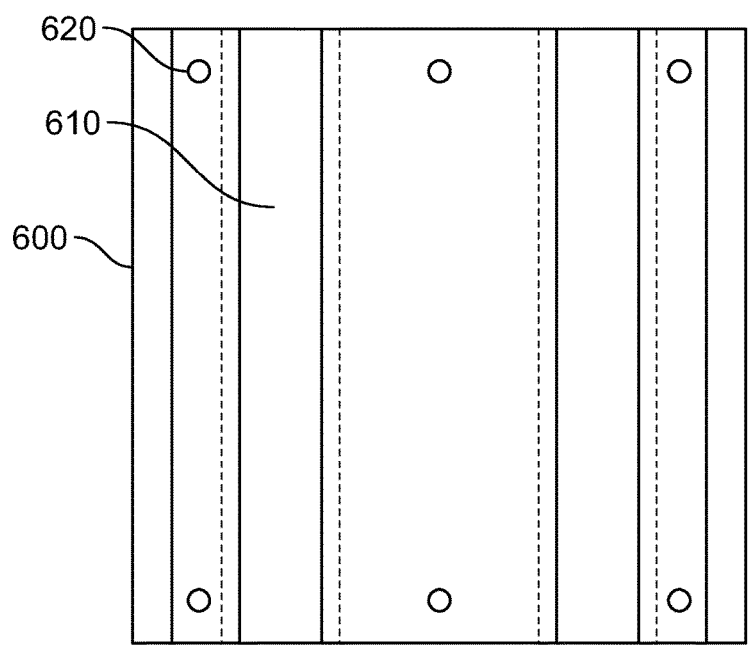

FIGS. 5A-5C sequentially illustrate a sled 410 picking up and moving a robotic arm assembly 420 in accordance with an embodiment of the invention.

Initially, with reference to FIG. 5A, the sled 410 moves into a position behind the robotic arm assembly 420.

With reference to FIG. 5B, the robotic arm assembly 420 retracts its arm, and safety barriers fold around the robotic arm. The sled 410 moves into place to pick up the robotic arm assembly which then disconnects from the floor via a coupling mechanism 430, discussed further herein.

FIG. 5C shows the sled 410 transporting the robotic arm assembly 420 to another location such as, for example, a workstation, a second robot, or another location each of which locations preferably includes a coupling mechanism to mount the robotic arm assembly safely to the floor.

FIGS. 6A-6D

FIGS. 6A-6D illustrate a coupling mechanism for securely connecting the robotic arm assembly 420 to the floor in accordance with one embodiment of the invention.

The floor mounting system is shown comprising two plates 600, 650. The first plate 650 is connected directly to the robotic arm assembly 420. First plate 650 is shown having a fixed plate 660, spring 670, and lift plate 680.

The second plate 600 is connected directly to the floor. Second plate 600 is shown having a pair of dovetail slots 610 and bolt holes 620. In operation, elongate runners 652 are slid into the slots 610. The elongate runners 652 and slots 610 cooperate to allow only axial movement in the direction of the slot, and not upwards movement. The runners 652 are shown having a trapezoidal-shaped profile. To secure the plates together, spring 670 pushes lift plate 680 onto floor plate 600 to lock them together using frictional forces. Not shown is an actuator capable of pushing up on lift plate 680 to enable relative sliding and release of the two plates. To engage the coupling mechanism, first plate 650 is slid into second plate 600 along elongate runners 652 and slots 610 while actuator is engaged. Actuator is then turned off and spring 670 pushes lift plate 680 onto floor plate 600. The interlocking architecture shown in FIGS. 6A-6D thus allows the robot mount 650 to be conveniently slid into the floor mount 600 and to enable a robust connection regardless of whether power is available to actuator.

Although not shown, cabling interconnects can be added to the plates to supply power and communication connectivity.

In embodiments, the spring-loaded lifting mechanism 670 can also contain the secondary side of a toroidal transformer core (or similar magnetic power transfer system). When the first and second plates are locked in place, the gap between them is very small, thereby enabling an efficient magnetic flux path and allowing a transformer to function across the gap. Signal can be passed similarly using an ethernet pulse transformer or similar in close proximity on each side of base. In such embodiments, power and communications can be transmitted wirelessly across the coupling mechanism, lessening the need for wires and other couplings.

A wide variety of modifications can be made to the mounting mechanism without departing from the scope of the invention.

FIGS. 7A, 7B

Figure 7B:
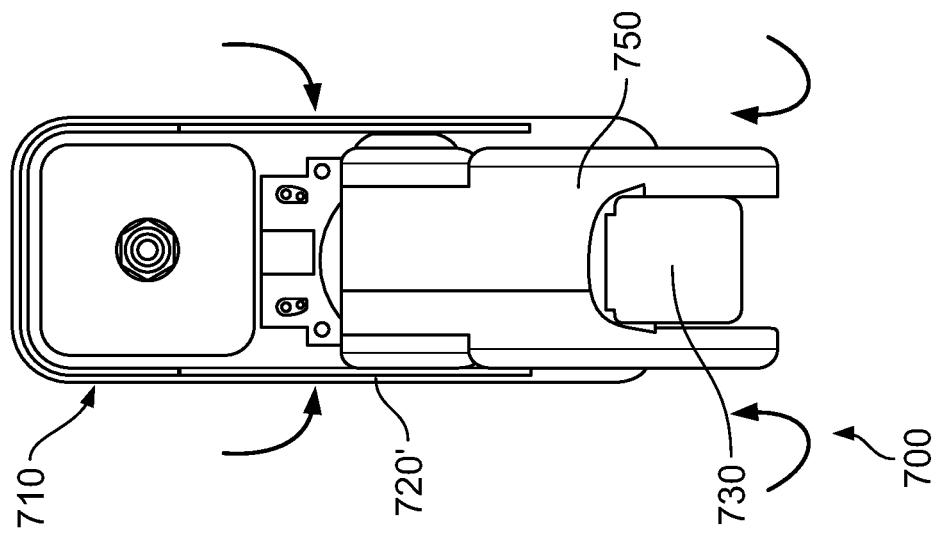
FIGS. 7A, 7B show a top view of a robotic assembly and safety glass in first and second configurations, respectively, in accordance with an embodiment of the invention.
Figure 7A:
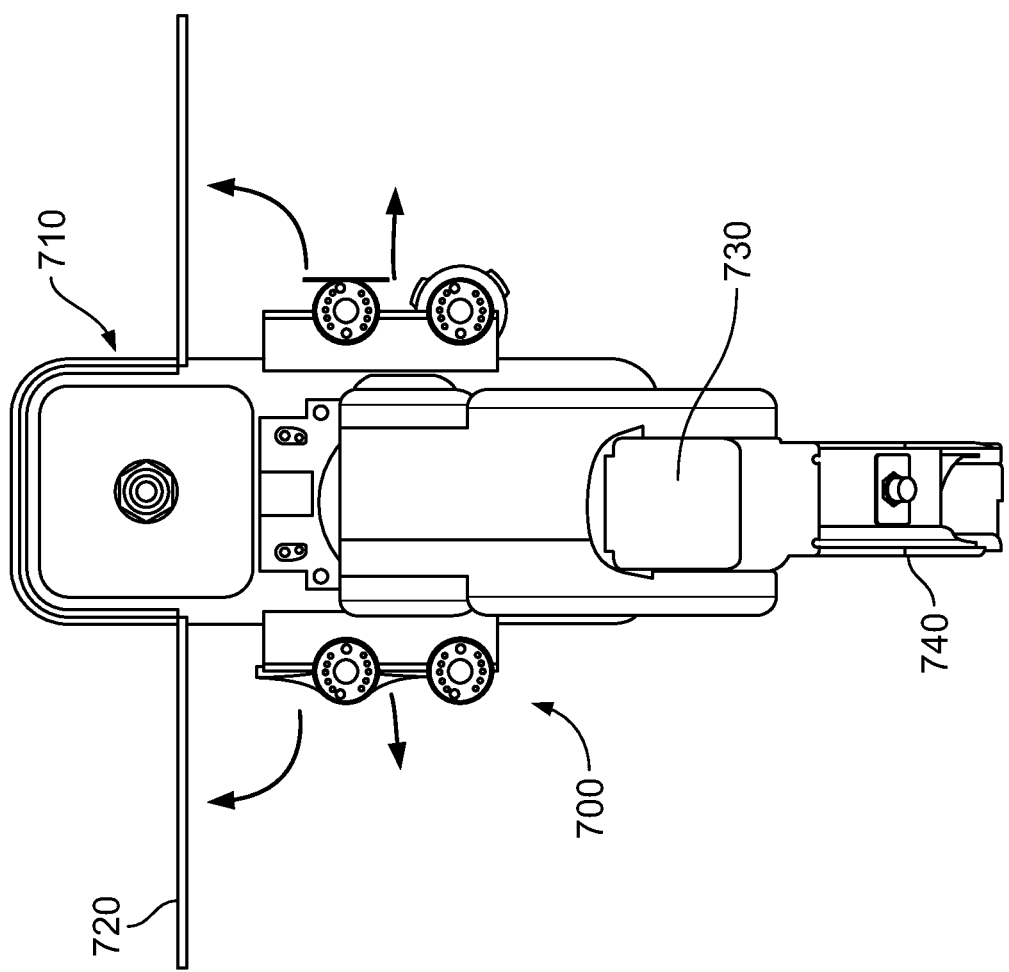

FIGS. 7A, 7B show top views of a robotic kitchen assistant 700 in a first and second configuration, respectively, in accordance with an embodiment of the invention. The robotic kitchen assistant 700 shown in FIGS. 7A, 7B includes safety barriers 720 to protect human kitchen workers from the motion of the robot arm 730 and any hazardous byproducts of the food preparation process.

FIG. 7A shows the safety barriers open (or expanded) 720 and FIG. 7B shows safety barriers closed denoted by reference numeral 720'.

In some implementations, the safety barriers 720 are transparent, enabling human kitchen workers to see what steps the robot is performing in order to improve collaboration and safety.

In some implementations, the safety barriers 720 are capable of displaying images and information on the robot that improve collaboration with human kitchen workers and safety. The information display can comprise: upcoming steps the robotic arm will perform, a depiction of upcoming motion of the robot arm; current status of the robot; actions that must be performed by human workers; and safety warnings. The information can be displayed using various technologies, as discussed further herein in connection with FIG. 8B.

FIGS. 8A, 8B

Figure 8B:
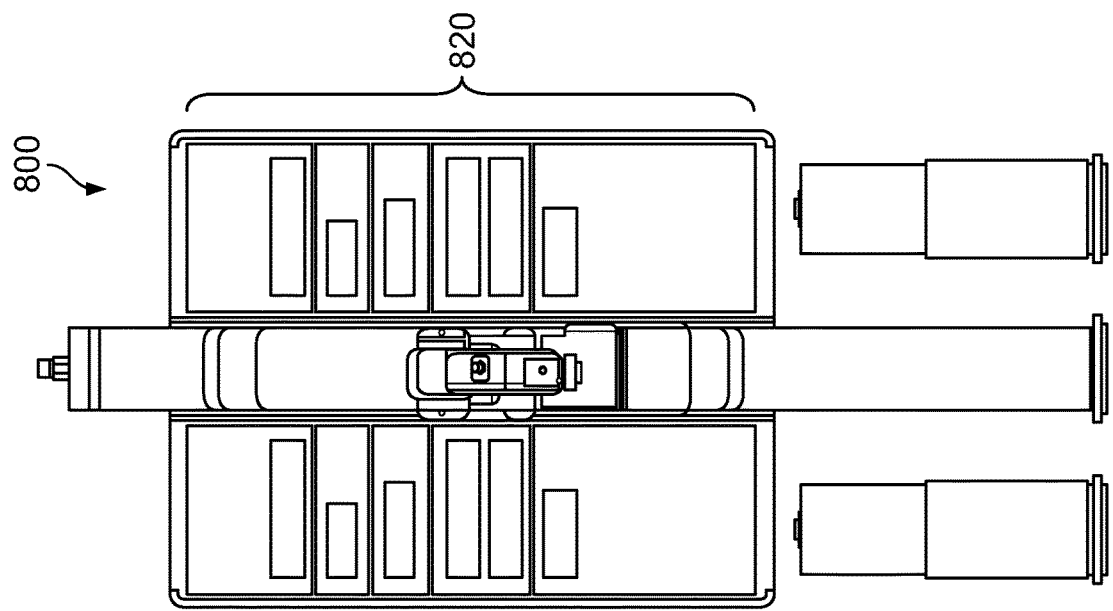
FIGS. 8A, 8B depict a front view of a robotic assembly and safety glass in first and second configurations, respectively, in accordance with an embodiment of the invention.
Figure 8A:
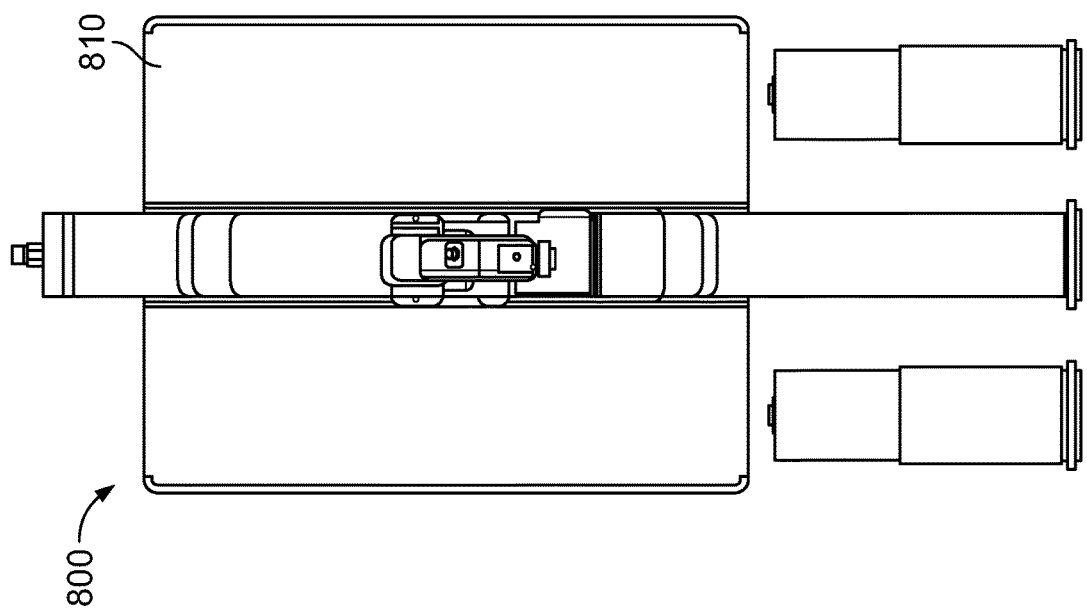

FIGS. 8A, 8B show a robotic kitchen assistant 800 including safety barriers in two different configurations. FIG. 8A shows a transparent safety barrier. FIG. 8B shows a safety glass 820 having information being displayed thereon. The information can be displayed using any number of techniques, including, but not limited to: transparent LCDs; laser projection systems; LCD projection systems; LEDs; LED projection systems; and OLED lighting systems.

FIG. 9A

FIG. 9A illustrates a food cannister 900 in accordance with one embodiment of the invention. Food canisters may be placed in the vicinity of the robotic arm (e.g., at a food workstation) using the sled described herein.

Food canister is shown having a robot tool adapter 910 that is gripped by the robotic arm to manipulate the canister. Food items stored in the food canister are accessible through cap 912. Also shown is a cross-sectional view of the food item compartment system 960 holding food item singulation units 950.

Examples of food item compartment systems 960 include, without limitation, shelves and an elevator operable to move the food item singulation units 950 to a position retrievable by the robotic arm.

Examples of food item singulation units 950 include, without limitation, trays, reusable separators, and disposable separators. In embodiments, the food items may not be singulated. In embodiments, item singulation units 950 are not used.

In embodiments, cap 912 is connected to the outer wall of the food canister 900 and removing the cap 912 exposes food item compartment system 960 and food item singulation units 950, enabling the robotic arm to access the food items. In embodiments, cap 912 is additionally connected to food item compartment system 960 and when the assembly is lifted, food items are accessible for manipulation by the robotic arm.

In embodiments, food item singulation units 950 (and optionally food item compartment system 960) are relatively sized such that it is smaller than the opening created by the removal of the cap 912. In such embodiments, food item singulation units 950 (and optionally food item compartment system 960) are attached to cap 912 which is further connected to robot tool adapter 910 and may be lifted from the remainder of the food canister. The canister shown in FIG. 9A has display electronics 930. The display electronics may indicate a wide range of information including e.g., its status, temperature of food items, fill level, and the date and time of expiration of their food items. Preferably, the canister is adapted to store the food in layers, as shown, separated for easy dispensing.

Preferably, the food supply canisters are standardized so that they can be easily manipulated by the robot arm. In some implementations, they have an identical interface to the interface that the robot arm uses to securely connect to its end effectors (for example robot tool adapter 910 as shown FIG. 9A).

In embodiments, waste (for example from the food preparation process) may be placed in food canisters and transferred via sled to a disposal area. In embodiments not shown, food item singulation units 950 and optionally food item compartment system 960 are replaced with a receptable capable of holding the waste.

The canister 900 shown in FIG. 9A also includes an insulation layer 940 and passageways 920 (or "air chambers") through which cold air from a refrigerated base 970, discussed herein, can be circulated to cool the food items.

FIG. 9B

FIG. 9B illustrates a food canister 900 and a refrigerated base 970 with food items stored in the food canister cavity 914. In FIG. 9B, the refrigerated base comprises: actuator 972 for food item compartment system 960; a chiller compressor 974, comprising a compressor and associated heat exchanger for removing heat from the compressor and compressed gas, and an expansion valve; a battery 976 (line power can also be used); and coils for cooling; heat exchanger coil and fan unit 978 for circulating air at a controlled temperature through passageways 920. In implementations, a thermoelectric cooler is used.

Not shown, food canister 900 assembly and refrigerated base 970 can be located on holder plate 52 described above that is adapted to be engaged by the robotic sled.

FIG. 10

Figure 10:
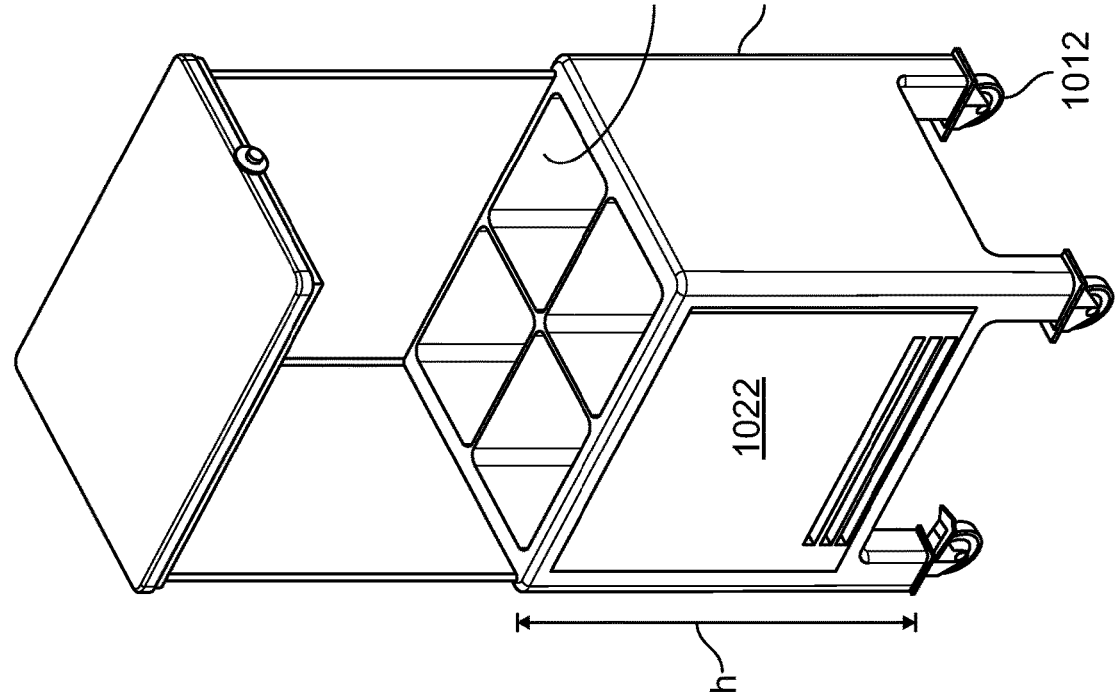
FIG. 10 illustrates a cart including multiple food storage containers in accordance with an embodiment of the invention.

FIG. 10 illustrates a cart 1020 including multiple food storage cavities 1010 and castor wheels 1012 in accordance with an embodiment of the invention. In embodiments, the food storage cavities 1010 are adapted to hold the food canisters described above.

Figure 11:
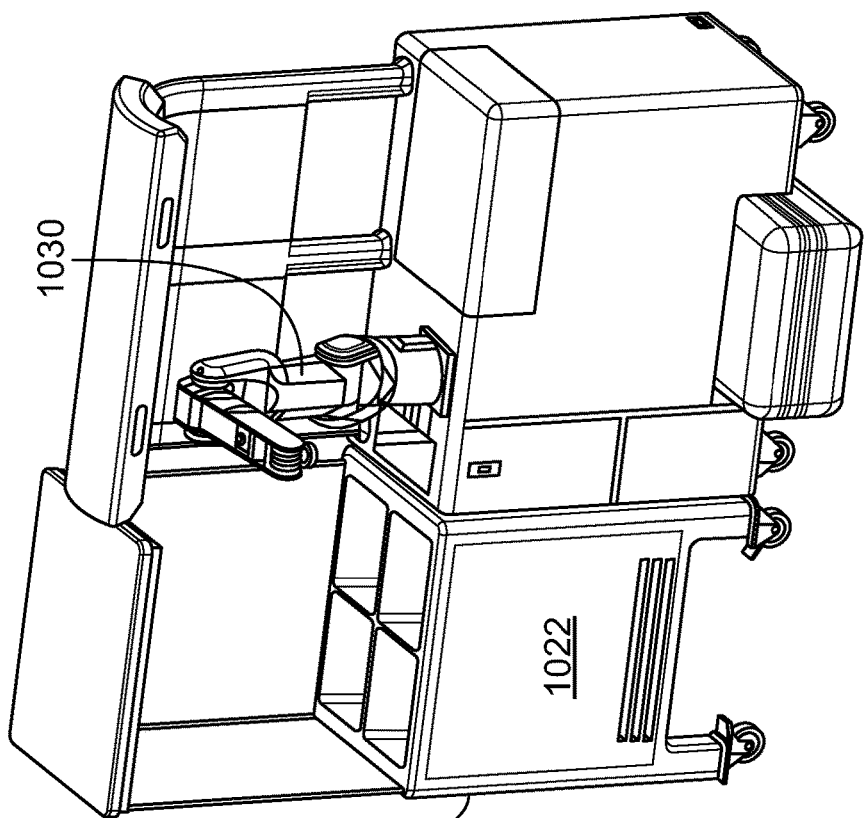
FIG. 11 illustrates the cart shown in FIG. 10 moved adjacent to a robotic kitchen assistant.

With reference to FIG. 11, cart 1020 is shown adjacent to the robot 1030. In implementations, the cart 1020 has a central cooling unit 1022 for maintaining the food items at desired temperatures. In implementations, the cart is adapted to place the height (h) of the food storage containers at a level that is also appropriate for use by a human. In embodiments, the height (h) ranges from 2 to 4 feet. In embodiments, the food storage cavities 1010 are adapted to hold food items directly which may include the food item singulation units 950 and optionally the food item compartment system 960 without the use of the food canisters.

In embodiments, the cart may be moved by a sled. In embodiments, the cart contains sensors for measuring variables comprising: temperature of food storage containers, temperature of food items, weight of food items, visual appearance of food items, and chemical emissions of food items that are communicated to the central processor.

Although only one robot and cart are shown in FIG. 11, in other embodiments, two or more robots, carts, and workstations are connected to perform multiple tasks. Preferably, the sled described herein is employed to autonomously move each of the components to the desired locations. Carts may be linked together to form one or more food workstations.

ALTERNATE EMBODIMENTS

Many modifications and variations of the present invention are possible in light of the above teachings. It is therefore to be understood that within the scope of the appended claims the invention may be practiced otherwise than as specifically described.

For example, although various autonomous sleds are described above having two opposing arms or a fork-shaped design to engage the holder plate, the invention is not intended to be so limited. The sled or autonomous mobile unit may feature a wide range of configurations or means to support, hold, transport, or engage food containers, refrigerated bases, or holder plates including, without limitation, recess, cavity, support, hold, key, peg, rail, magnet, and hook.

The invention claimed is:

1. An automated robotic-based food preparation method for performing a food preparation step in a kitchen environment, said kitchen environment comprising a robotic arm and a local storage including a plurality of cavities, said method comprising:
    monitoring current inventory levels of at least one food item in the local storage necessary for the food preparation step;
    providing a mobile unit adapted to transport the at least one food item to the local storage;
    providing a scheduling engine including a processor programmed or operable to carry out the following steps:
        computing optimum inventory levels based on current inventory levels, demand, food expiration times, estimated inventory level replenishing times, and production capacity;
        evaluating said current inventory levels and optimum inventory levels for whether the current inventory levels are sufficient for the robotic arm to perform the food preparation step; and
        sending a replenish command to the mobile unit for automatically replenishing the current inventory levels if the current inventory levels are insufficient to perform the food preparation step;

automatically replenishing the current inventory levels, wherein the automatically replenishing step is performed by navigating the mobile unit carrying the at least one food item to the local storage along a route while avoiding obstacles along the route; and wherein estimated inventory level replenishing times includes estimated time to replenish the inventory.

2. The method of claim 1, wherein the step of navigating is performed by an electric sled.

3. The method of claim 2, further comprising performing a food preparation step with the at least one food item retrieved by the electric sled.

4. The method of claim 2, wherein the at least one food item is stored in a food canister and the sled transports said food canister.

5. The method of claim 4, further comprising monitoring the temperature of the at least one food item in the food canister.

6. The method of claim 5 further comprising refrigerating the at least one food item in the food canister wherein the food canister contains a temperature sensor capable of monitoring the temperature of the at least one food item.

7. The method of claim 2, wherein the electric sled further comprises at least one of the following sensors: 3D lidar and camera.

8. The method of claim 7, wherein the electric sled comprises an onboard processor operable to navigate the electric sled based on data received from the sensors.

9. The method of claim 8, wherein the electric sled comprises wheels.

10. The method of claim 8, wherein the electric sled further comprises an electric powertrain.

11. The method of claim 1, wherein the evaluating step is based on demand and the demand comprises projected demand.

12. The method of claim 11, wherein the projected demand is based on restaurant order history.

13. The method of claim 1, further comprising monitoring waste levels.

14. The method of claim 13, further comprising collecting waste; monitoring the waste collected; and removing the waste, and wherein the removing the waste comprises commanding an electric sled to transport the waste from the robotic arm.

15. The method of claim 1, wherein the step of automatically replenishing comprises transferring the at least one food item to a food inventory cavity by the robotic arm.

16. The method of claim 1, wherein the automatically replenishing is based on obtaining real-time image data from observing objects in the kitchen environment.

17. The method of claim 16, wherein the obtaining of the real time image data is performed using a camera or sensor coupled to a robotic kitchen assistant.

18. The method of claim 1, wherein the robotic arm includes a base adapted to couple with a fork shaped sled design of the mobile unit.

19. The method of claim 18, comprising at least one food container adapted to fit in one of said cavities of the local storage, and wherein the fork shaped sled design is adapted to couple with a portion of each of the at least one food container.

20. The method of claim 1, further comprising providing a safety barrier on each side of the robotic arm to protect human kitchen workers from motion of the robotic arm and hazardous byproducts of the food preparation process, and wherein the safety barriers include open and closed configurations.

21. The method of claim 20, further comprising displaying instructions for human kitchen workers to perform on the safety barriers.

22. The method of claim 21, wherein the safety barriers are transparent, and the information is displayed using at least one display system selected from the group consisting of: transparent LCDs; laser projection systems; LCD projection systems; LEDs; LED projection systems; and OLED lighting systems.

* * * * *